United States Patent [19]
Grantz et al.

[11] Patent Number: 6,154,339
[45] Date of Patent: *Nov. 28, 2000

[54] CENTRIFUGAL CAPILLARY SEAL FOR USE WITH FLUID DYNAMIC BEARINGS

[75] Inventors: Alan Lyndon Grantz, Aptos; Mohamed Mizanur Rahman, San Jose, both of Calif.

[73] Assignee: Seagate Technology LLC., Scotts Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/060,328

[22] Filed: Apr. 14, 1998

Related U.S. Application Data

[63] Continuation-in-part of application No. 08/994,099, Dec. 19, 1997.
[60] Provisional application No. 60/064,589, Nov. 6, 1997.
[51] Int. Cl.[7] .............................. G11B 17/02; F16C 33/74
[52] U.S. Cl. .................................. 360/99.08; 360/98.07; 384/110
[58] Field of Search .............................. 360/98.07, 99.08, 360/99.05, 97.02, 99.12; 384/107, 110, 119, 124, 112, 113, 123, 130

[56] References Cited

U.S. PATENT DOCUMENTS

| | | | |
|---|---|---|---|
| 3,606,501 | 9/1971 | Waplington . | |
| 5,067,528 | 11/1991 | Titcomb et al. | 141/4 |
| 5,112,142 | 5/1992 | Titcomb et al. | 384/107 |
| 5,246,294 | 9/1993 | Pan | 384/119 |
| 5,423,612 | 6/1995 | Zang et al. | 384/119 |
| 5,448,120 | 9/1995 | Schaule et al. | 310/90 |
| 5,516,212 | 5/1996 | Titcomb | 384/107 |
| 5,533,811 | 7/1996 | Polch et al. | 384/107 |
| 5,558,445 | 9/1996 | Chen et al. | 384/132 |
| 5,559,651 | 9/1996 | Grantz et al. | 360/99.08 |
| 5,658,080 | 8/1997 | Ichiyama | 384/112 |
| 5,697,708 | 12/1997 | Leuthold et al. | 384/110 |
| 5,707,154 | 1/1998 | Ichiyama | 384/107 |
| 5,791,785 | 8/1998 | Nose et al. | 384/119 |
| 5,806,987 | 9/1998 | Nose et al. | 384/100 |
| 5,876,124 | 3/1999 | Zang et al. | 384/107 |

*Primary Examiner*—William Klimowicz
*Attorney, Agent, or Firm*—Flehr Hohbach Test Albritton & Herbert

[57] ABSTRACT

An improved capillary seal for use with a hydrodynamic bearing is disclosed, which provides a stronger or stiffer seal for a fluid dynamic bearing motor which is open at both ends, and is used with top cover attached motors utilizing fluid dynamic bearings. The design of the capillary seal uses centrifuigal force to actively push the oil back into the FDB while it is spinning, combined with the capillary tension which holds oil in the FDB during stationary periods. Also, the seal design comprises two walls which converge toward an apex near an adjacent fluid dynamic bearing. This design allows air, trapped within the seal and the associated FDB, to be expelled, eliminating air bubbles from the fluid dynamic bearing.

14 Claims, 7 Drawing Sheets

CENTRIFUGAL CAPILLARY SEAL FOR USE WITH FLUID DYNAMIC BEARINGS

CROSS-REFERENCE TO RELATED APPLICATION

This invention is based on U.S. Provisional Patent Application, Serial No. 60/064,589, filed Nov. 6, 1997, assigned to the assignee of this application and incorporated herein by reference. This application is a continuation-in-part of U.S. application Ser. No. 08/994,099, filed Dec. 19, 1997 entitled "SIMPLIFIED CONICAL BEARING WITH INDEPENDENT FLOW PATHS" by Murthy, et al., assigned to the assignee of this application and incorporated herein by reference.

FIELD OF THE INVENTION

The present invention relates to fluid dynamic bearings, and more specifically, the present invention relates to a capillary seal for use with a hydrodynamic fluid bearing, especially as they are used in disc drive storage systems.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as gas or a liquid provides a bearing surface between a fixed member of the housing and a rotating member of the disc hub. Typical lubricants include oil or ferromagnetic fluids. Hydrodynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

However, some hydrodynamic bearing designs themselves suffer from disadvantages, including a low stiffness-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, hydrodynamic motor designs provide no method for top cover attachment. The reason for this is that in order to have top cover attachment, the motor (i.e. the fluid bearing which separates the fixed and moving parts) would need to be opened on both ends. Opening a motor at both ends greatly increases the risk of oil leakage out of the hydrodynamic bearing. This leakage among other things is caused by small differences in net flow rate created by differing pumping pressures in the bearing. If all of the flows and pressures within the bearing are not carefully balanced, a net pressure rise toward one or both ends may force fluid out through the capillary seal. Balancing the flow rates and pressures in conventional, known fluid bearing designs is difficult because the flow rates created by the pumping grooves are a function of the gaps defined in the hydrodynamic bearing, and the gaps, in turn, are a function of parts tolerances. Thus, a need exists for a new approach to the design of a hydrodynamic bearing based motor and especially the capillary seal or seals used to retain fluid in the motor.

As presently designed, fluid dynamic bearing motors seal the open end, whether it is just one end or both ends, using a capillary seal which simply comprises two relatively angled surfaces at the end of the gap with the seal being formed from one surface angled relative to the other. The problem with such conventional capillary seals is that they depend entirely on surface tension to maintain or draw fluid back into the motor. When used in pairs, as in a motor having an FDB which is open at both ends, such as a top cover attached motor, such a pair of capillary seals can be categorized as a pull-pull system; when there is more oil in one end than the other, the capillary seal with the lesser amount of oil pulls harder than the opposing capillary seal, and restores equilibrium. However, such capillary seals have been shown to be quite weak. For example, in one known configuration, which has been tested, a pair of capillary seals has a restoring stiffness about 580 Pa/mm. or 0.006 atm/mm. The problem with this low stiffness in a motor open at two ends is that only a small pressure imbalance in the motor can overcome the low seal stiffness, and cause oil to be lost.

SUMMARY OF THE INVENTION

It is an object of the present invention to create an improved capillary seal for use with a hydrodynamic bearing.

More specifically, it is an objective to provide a stronger or stiffer seal for a fluid dynamic bearing motor which is open at both ends. Stated another way, an objective is to provide an unbalanced sealing stiffness adjacent a fluid dynamic bearing, where sealing stiffness represents the seals ability to prevent loss of fluid from an adjacent fluid dynamic bearing.

A further and related objective of the invention is to provide an improved capillary seal for use with top cover attached motors utilizing fluid dynamic bearings.

Yet another objective of the invention is to achieve a design for a capillary seal which utilizes centrifugal force to actively push the oil back into the FDB while it is spinning, combined with the capillary tension which holds oil in the FDB during stationary periods.

Yet another objective of the invention is to achieve a seal design which allows air, trapped within the seal and the associated FDB, to be expelled, eliminating air bubbles from the fluid dynamic bearing.

A further objective is to provide a capillary seal capable of storing a larger volume of fluid adjacent a FDB so that maintenance of the desired fluid level over the bearing life is assured.

A related objective is to provide a capillary seal design which facilitates adding fluid to a fluid dynamic bearing.

These and other objectives of the present invention are achieved by providing a hydrodynamic bearing usable in a bearing cartridge or spindle motor or the like where the bearing is defined between two relatively rotating surfaces which at an end are open to the air. In the typical capillary seal, one of the surfaces is at an angle to the other, causing a meniscus to form which is intended to hold the fluid in the bearing. However, the rotating surface is vertical, and centrifugal force tends to flatten the oil film and drive it to the outside of the seal when the motor is spinning. In contrast, to implement the present centrifugal capillary seal, a reservoir defined between two surfaces at a acute angle to one another; further, both surfaces are at an acute angle with respect to the spin axis of the shaft along which the bearing is defined. One of these surfaces is on a piece which is fixed to the non-rotating surface; the other surface is a wall defined on the rotating portion of the bearing. As a result of the centrifugal force created by the rotation of the wall, a pressure gradient is created which pushes the oil radially back into the reservoir away from the open end of the motor. This design also develops a pressure gradient from the wider, open end of the seal reservoir to the narrow end with the narrow end being at the higher pressure and in contact or in communication with the main portion of the hydrodynamic bearing. Because of this pressure gradient, air bubbles which appear in the hydrodynamic fluid bearing travel out against the pressure gradient and are ejected through the meniscus of the capillary seal.

Other features and advantages of the present invention would become apparent to a person of skill in the art who studies the present invention disclosure given with respect to the following figures.

DETAILED DESCRIPTION OF A PREFERRED EMBODIMENT

Figure 1:
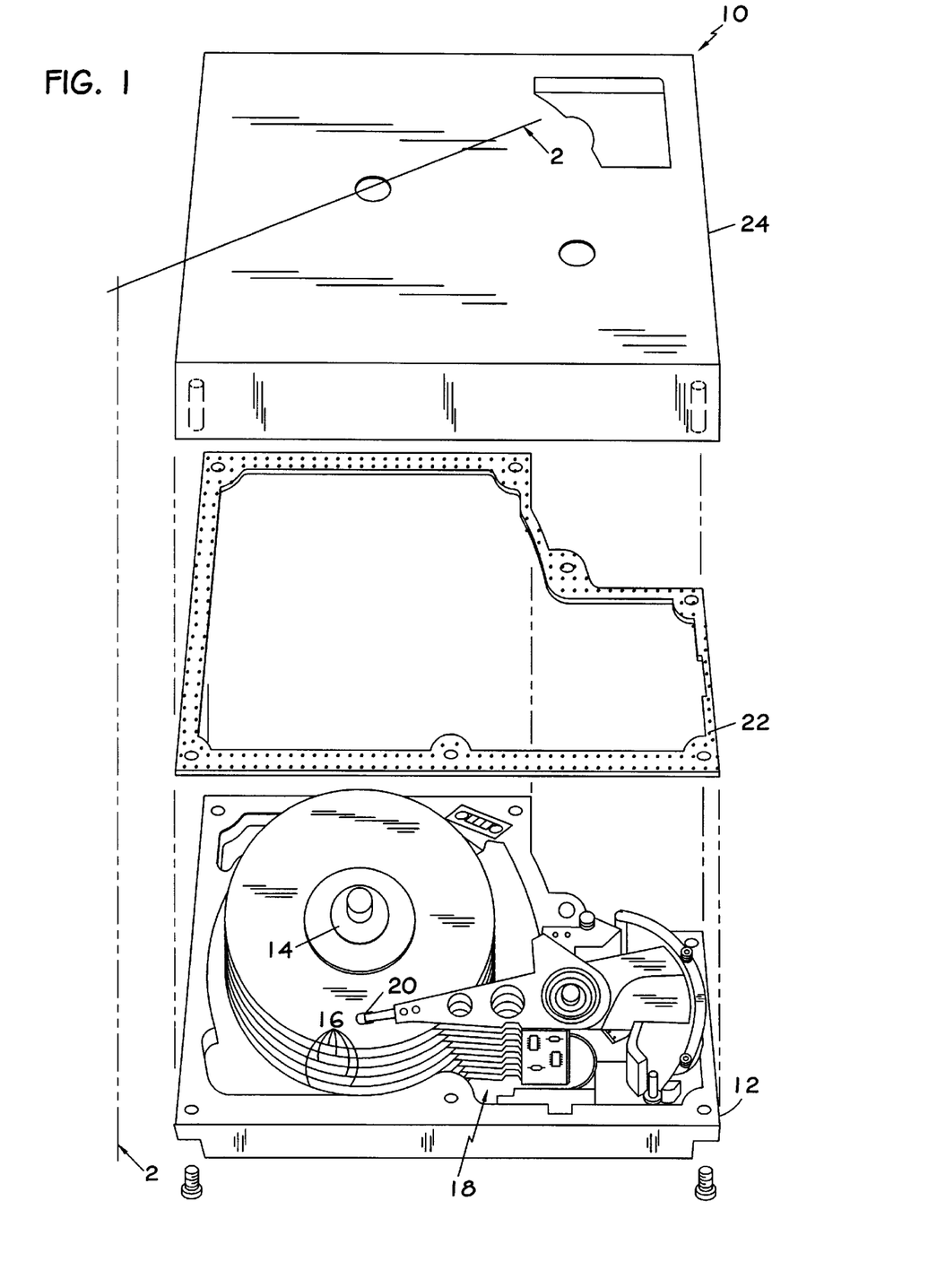
FIG. 1 is an exploded perspective view of a disc drive in which the present invention is useful.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing design is not limited to use with this particular design of a disc drive, which is shown only for purposes of the example. The bearing cartridge (that is the bearing and motor elements, excluding the hub which is attached to support a disc) also has numerous other uses outside the field of disc drives. Further, the seal could easily be used on a bearing where the shaft rotates and a surrounding wall or sleeve is fixed.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble. Thus, a highly stable FDB to support the hub of motor 14 for rotation about the shaft is essential.

The present invention will next be described with respect to the following figures. This application will disclose in detail several embodiments of the centrifugal capillary seals. Details of several of the structural elements which appear herein can also be found by referring to the cited co-pending patent applications which are incorporated herein by reference. Obviously, the seal taught herein can be used with many types of hydrodynamic bearings, whether open at one or two ends.

Figure 2:
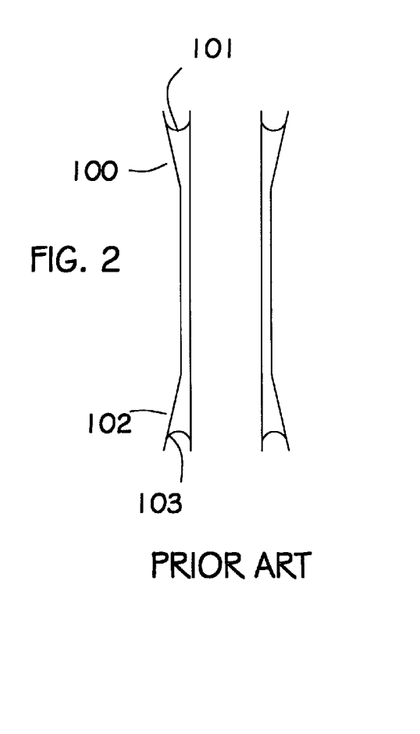
FIG. 2 is a vertical sectional view of a prior art capillary seal.

It is already well know to use a capillary seal to retain the fluid at the open end of a hydrodynamic bearing and, until this time, it has been conventional as shown in FIG. 2, to use capillary seals 100, 102 at both ends of a fluid dynamic bearing which is open at both ends. However, such conventional capillary seals 100, 102 depend entirely on surface tension at the meniscus 101, 103 to maintain or draw fluid back into the motor. When used in pairs, as in a top cover attach motor which is open at both ends, they can be categorized as a pull-pull system. When there is more oil in one end than in the other, the capillary seal with the lesser amount of oil pulls harder than the opposing capillary seal and restores equilibrium. In a known example, as mentioned above, such a pair of capillary seals may have a restoring stiffness of about 580 Pa/mm or 0.006 atm/mm. Obviously, only a small pressure imbalance can overcome the seals' stiffness and allow oil to be lost.

Figure 3:
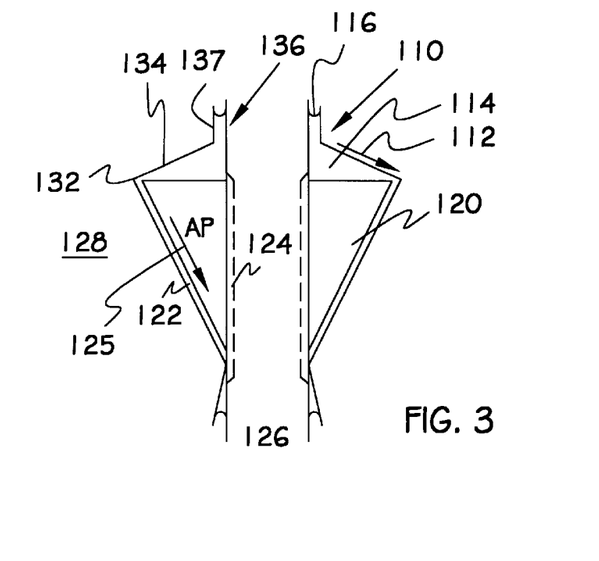
FIGS. 3, 4A, 4B and 5 show alternative embodiments of the centrifugal capillary seal of this invention.

To overcome this problem, the approach shown in one of its simplest forms in FIG. 3 was defined. This centrifugal capillary seal generally indicated at 110 utilizes centrifugal force represented by the arrow 112 to create a pressure gradient which pushes the oil back into the motor. This is because a reservoir 114 has now been defined as part of the seal, which reservoir has at least partially a radial dimension to take advantage of the centrifugal force imposed on the fluid by the spinning of the motor. The pressure gradient established by the centrifugal force pushes the oil which is in this reservoir into the hydrodynamic bearing of the motor. This pressure gradient, while pushing the oil into the reservoir and adjacent hydrodynamic bearing also drives air out of the motor, because the pressure gradient (from lower to higher pressure) will be in the direction of the arrow 112; the air bubbles which may appear in the fluid will flow from regions of high pressure to lower pressure, and thus will tend to exit the capillary seal at the meniscus 116.

Because of the volume of this seal provided by the reservoir 114 is greater than that of a conventional capillary seal, the seal and the hydrodynamic bearing are better able to accommodate both thermal expansion and evaporation induced volume changes; the design also facilitates filling of the hydrodynamic bearing with fluid.

In FIG. 3, the centrifugal capillary reservoir 114 is shown used adjacent a conical fluid dynamic bearing 120 of a type which will be explained in greater detail below. Basically, the fluid flows or is maintained in gaps 122 and 124 to allow the shaft 126 to remain fixed while the surrounding surfaces supported on or defined by a sleeve generally indicated at 128 rotate over the gap 122. Thus the centrifugal capillary seal of the invention, by maintaining fluid in the reservoir 114 and establishing the gradient along arrow 112 maintains the fluid within the gap 122 of the FDB, which is essential to the smooth relative rotation. Further, air bubbles will tend to flow against the pressure indicated by arrow 125 into the reservoir 114. That is, typically in a conical FDB bearing of the design shown, the pressure is developed in the direction of the arrow 130 away from the apex 132 of the bearing. Thus, air will tend to flow toward the apex and into the reservoir to be expelled through the meniscus of the capillary seal 116. The construction of FIG. 3 would be relatively simple as the counterplate surface 134 of the rotating member 128 could be tapered to create the centrifugal reservoir 114.

Figure 4A:
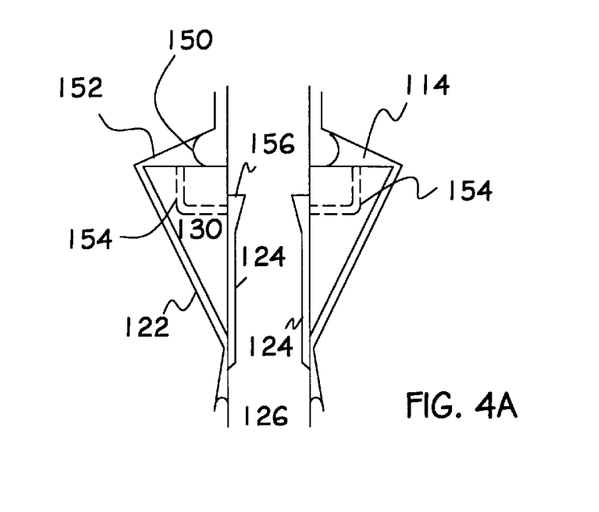

However, the design of FIG. 3 has one potential weakness in that the capillary seal itself and therefore a small portion of the liquid is located in a generally axial region 136 of the bearing gap. Therefore, the centrifugal forces tend to push the fluid against the wall of the surrounding member 128. Thus, as an alternative, the design of FIG. 4 may be adopted, where the meniscus of the capillary seal 150 now appears at or near the end of centrifugal reservoir 114 itself, so that the centrifugal forces act at least in part to force the fluid against as well as being into the reservoir up against the wall 152 of the surrounding member. To achieve this, holes 154 must be cut through the cone to communicate with the grooves 124 which are cut between the outer surface of the shaft 126 and the inner surface of the cone 130. This provides a means for maintaining continuity of flow between the ends of the cone, and also provides a means for maintaining the meniscus 150 in the centrifugal reservoir 114 close to the inner radius of the cone 130. To further enhance the flow of liquid into the reservoir, and in the gap 122, a reservoir 156 may be cut into the shaft. This reservoir 156, which is tapered to provide the necessary volume, is in communication both with the grooves 124 between the cone and the shaft, and with the holes 154 which communicates between the grooves, shaft reservoir 156, and centrifugal reservoir 114. In this manner, fluid is constantly maintained in gap 122 between the shaft 126 and surrounding sleeve 128. It is important to note that in these embodiments, as well as those to follow, the hydrodynamic bearing supports relative rotation of the shaft and sleeve, the shaft may be either fixed or rotating, and so may the sleeve.

Figure 4B:
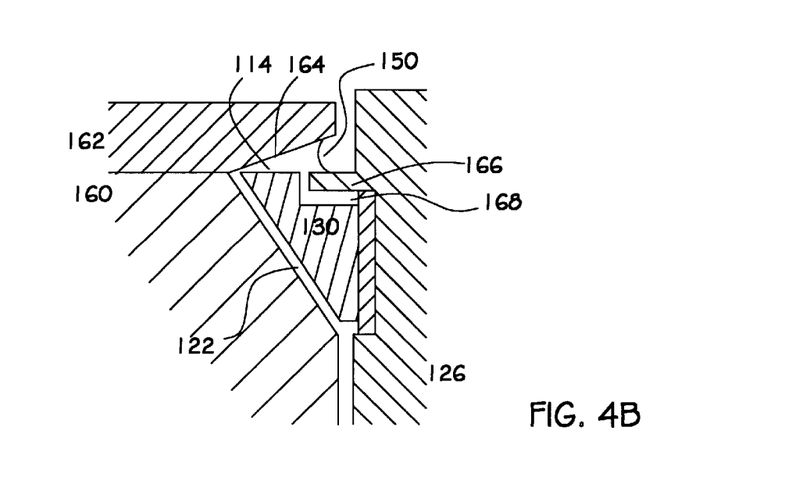

FIG. 4B is a design which is essentially an alternative of FIG. 4A, showing once again a fixed shaft 126 surrounded by relatively rotating elements which in this example can be considered to be a hub 160 including a top seal or counter-plate 162 having a tapered surface 164 to form the centrifugal reservoir 114. In this embodiment, a top seal plate 166 is fixed to or integrated with the shaft; thus rather than providing holes 154, a channel 168 may be cut into the top surface of the conical bearing 130 to provide the necessary fluid circulation over the bearing section. As with FIG. 4A, the meniscus 150 of the capillary seal is subject to the centrifugal forces, aiding in the maintenance of all the fluid within the reservoir 114 as well as forcing fluid into the bearing gap 122.

Figure 5:
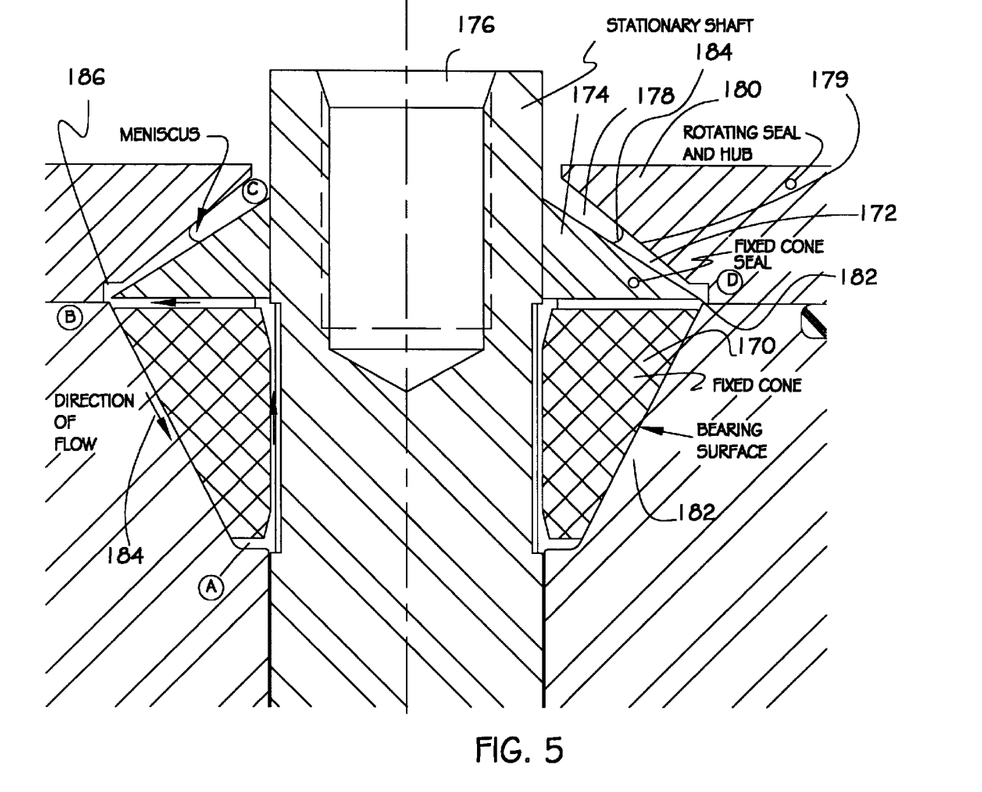

Yet another embodiment is shown in FIG. 5; this particular embodiment while having a slightly higher profile, is also optimized for maintaining the fluid circulation over the surface of the bearing cone 170 while maintaining the fluid in the centrifugal reservoir 172. This embodiment will also be shown fully incorporated in a motor described with respect to FIGS. 6A and 6B.

This design incorporates a sealing cone 174 supported from the fixed shaft 176. An upper surface 178 of the sealing cone which forms an acute angle with the surface of the shaft defines one side of the capillary reservoir 172; the opposite side, which if extended, would also form an acute angle with the surface of the shaft is established by a rotating member 180 which rotates with the outer hub (not shown) and the bearing seat 182 which rotates past the bearing cone 170. The surfaces 178, 179 are tapered toward each other, forming a large gap at the opening, and a far smaller gap near the apex 182. In this way, because of the relative tapering, a meniscus 184 for the capillary seal is formed; and because of the at least partially radial dimension of the reservoir 172, the centrifugal force created by the spinning of the member 180 forces the fluid generally against the surface 179 and into the reservoir 172, and ultimately toward the apex 182. From here, the fluid can travel through the apex and into the hydrodynamic bearing gap to support the fluid flow needed to lubricate the bearing to maintain rotation of the bearing seat 182 relative to the cone 170. The general fluid flow is represented by the arrows 184. It has been found experimentally that it is also useful to provide an optional counter bore 186 at the apex so that any entrapped air bubbles may pass more easily through the apex and into the bearing.

Figure 6A:
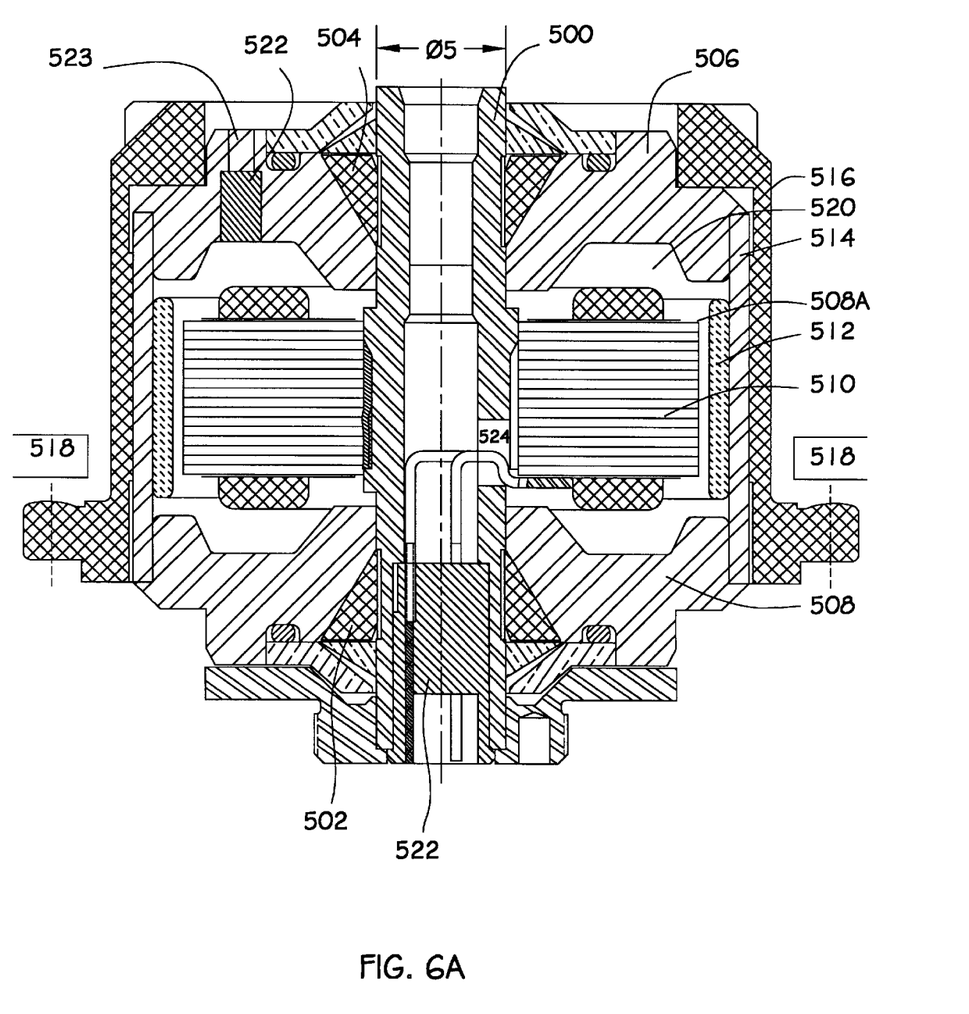
FIGS. 6A and 6B are vertical sectional views of the centrifugal capillary seal incorporated in a motor and used in combination with another seal.
Figure 6B:
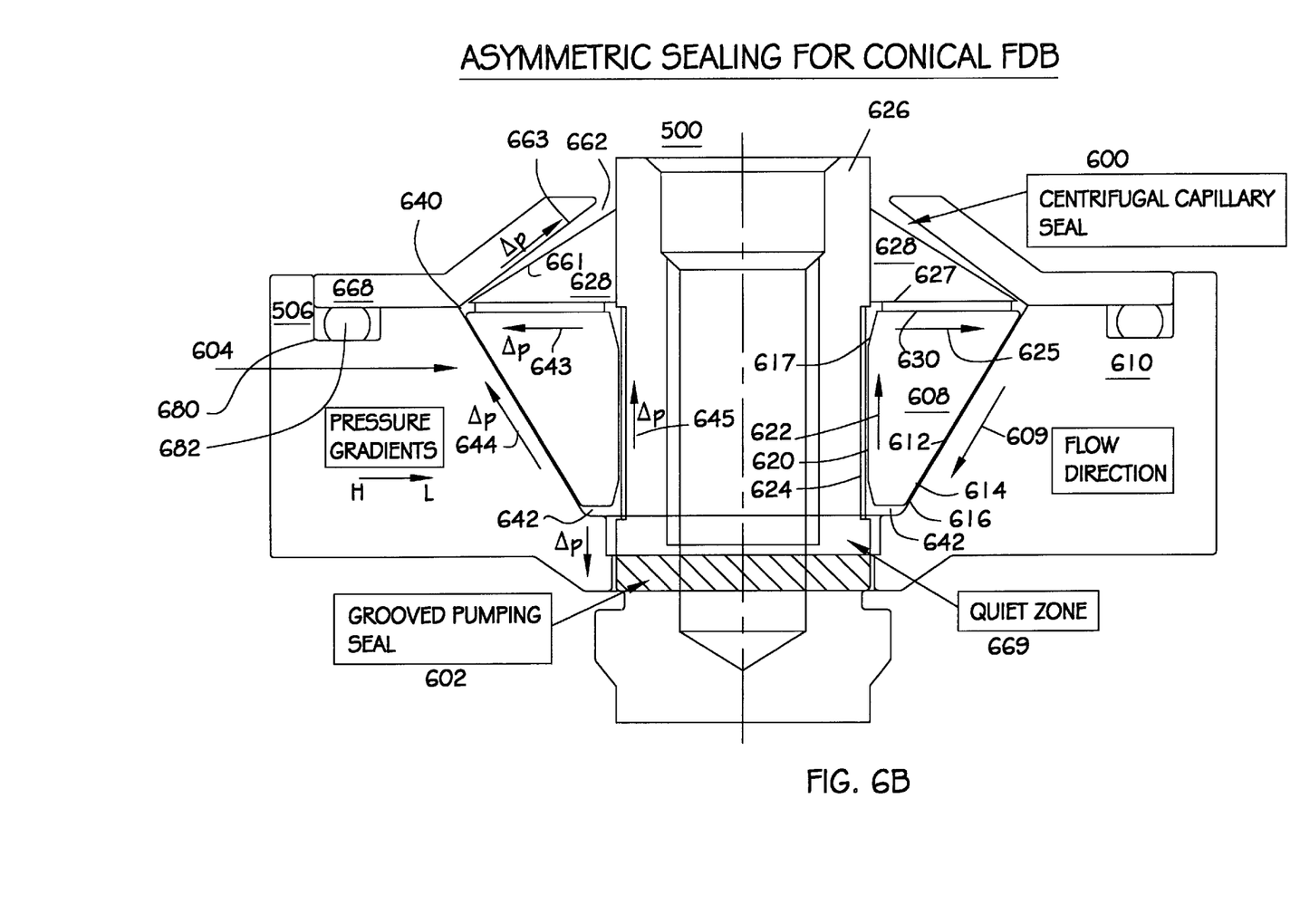

The incorporation of this centrifugal capillary seal of this invention will now be shown with respect to FIGS. 6A and 6B. In FIGS. 6A and 6B, the centrifugal capillary seal of the invention is shown used in combination with a grooved pumping seal mounted on the opposite side of the bearing cone 170. However, a simple capillary seal or other sealing means could be provided on the opposite side of the sealing cone and a useful design would be achieved. Further, the centrifugal capillary seal could be used in combination with a bearing design which incorporates journal or thrust plate type fluid dynamic bearings or the like; the designs of such are well known in the prior art.

Referring to FIG. 6A, a fixed shaft 500 supports spherical or conical bearings 502, 504 near the opposite ends of the shaft. The central section 508A of the shaft directly supports a stator 510 which cooperates with a magnet 512. The stator mounting, with its inner dimension generally aligned between the FDBs, provides a narrow profile for this in-hub motor. The magnet 512 is supported from a back iron 514 on the interior surface of hub 516 so that energization of the stator 510 causes rotation of the hub and the disc or discs 518 supported thereon. It can be seen that the bearing seats 506, 508 extend radially from the shaft out beyond the radial dimension of the shaft supported stator 510 and support the back iron 514 and the hub 516. This defines an enclosed space 520 for the stator and magnet, enclosing a possible source of contaminants. A pressure equalizing filter 522 is incorporated into at least one of the bearing seats 506. The filter extends at least part way through an opening 523 which extends entirely through the bearing seat 506 so that no contaminants generated within space 520 can escape. Defining this enclosed space also allows implementation of a vacuum filling technique.

This motor is open at both ends, presenting the problem of easily filling the fluid dynamic bearings 502, 504 with bearing fluid, and thereafter preventing the escape of any such fluid. This invention also addresses the problem which is posed by the fact that air can sometimes become entrapped in the fluid, reducing the effectiveness of the fluid dynamic bearing. Therefore, the present invention provides means for expelling the air from the fluid dynamic bearing, so that the effectiveness and life time of the bearings are optimized.

As with the previous embodiment, the motor of FIG. 6A incorporates two totally separate fluid dynamic bearings on either side of a stator, with no fluid flow along the central section 508A of the shaft, the FDB's being mounted on either side of this central section. Details of each of the bearings and the general theory of their operation will next be explained with respect to FIG. 5B. Further details and alternative approaches to these designs, which may be incorporated in the present motor, can be found in the following applications all of which are filed contemporaneously herewith and incorporated herein by reference:

U.S. patent application Ser. No. 09/060,342 (Attorney Docket No. A-65485), entitled "GROOVED PUMPING SEAL," by Grantz, et al.;

U.S. patent application Ser. No. 09/060,225 (Attorney Docket No. A-65484), entitled "IN-HUB SPINDLE MOTOR WITH SEPARATE FLUID DYNAMIC BEARINGS," by Grantz, et al.; and U.S. patent application Ser. No. 09/060,224 (Attorney Docket No. A-65483), entitled "ASYMMETRIC SEALING MEANS FOR FLUID DYNAMIC BEARINGS," by Grantz, et al; all of which are assigned to the assignee of the present invention and incorporated herein by reference.

Thus, referring next to FIG. 6B, the sealing design shown meets the needs of providing a very positive sealing means for fluid dynamic bearing motors which have two independent fluid dynamic bearings. Of course, the design of FIG. 6B and its alternatives could be used with other motors wherever two independent fluid dynamic bearings are used. The significance of the design, among others, is that it does not require a close balance of pressure between the top and bottom of the bearing. Further, as explained above, the centrifugal capillary seal provides a means for expelling air bubbles from the fluid in the associated hydrodynamic bearing. In addition, by combining the characteristics of the centrifugal capillary seal generally indicated at 600 (which provides a means for pushing fluid toward the fluid bearing when the motor is spinning and for holding the fluid in the gap when the motor is at rest), and the grooved pumping seal generally indicated at 602 (which provides a means for holding and sealing the fluid in the FDB), together with the conical/spherical bearing generally indicated at 604, the fluid is positively maintained on the surface of the bearing. The seals also provide means for expelling any air bubbles which may enter the bearing system.

The Figure is drawn to illustrate the fluid flows over the bearing surface (on the right) and the pressure gradients developed by the bearing and seals (on the left).

As is already well known, the primary support system in the bearing comprises the bearing cone 608 and the surrounding bearing seat 610. These pieces define facing surfaces 612, 614 which are separated by gap 616 of about five microns (although this dimension is representative of example only; it may be greater or less depending on the performance requirements of the bearing and tolerances achieved by parts and assembly methods). Fluid fills this gap 616, and is maintained under pressure within this gap by grooves on the surface of the bearing cone 608 or bearing seat 610. These grooves are defined to establish some fluid flow in the direction of arrow 609. To allow for fluid circulation, and maintenance of the fluid in the gap 616, a flow passage 617 is extended between the back surface 620 of the bearing cone 608 and the facing surface 624 of the shaft by providing grooves or the like running linearly along the back surface of the cone or the facing surface 624 of the shaft. These passages 617 allow the fluid to pass axially from the point adjacent the narrow end 642 of the cone adjacent the grooved pumping seal 602, as marked by arrow 622 toward the distal end 626 of the shaft 500. The flow path for the fluid is completed as marked by arrow 625 through a gap between a wall 627 of the sealing cone 628 and the upper surface 630 of the bearing cone 608. Most efficiently, the flow path is through grooves formed in the top surface 630 of the cone 608, although the grooves could also be provided in the complementary surface 627 of the sealing cone 628.

As is shown by the arrows marked Δp on the left of FIG. 6B, the pumping action of the grooves 618 on the face of the cone create a pressure differential from the apex 640 of the bearing cone toward the narrower end 642 of the cone. The pressure gradients, indicated by the arrows 643, 644, 645 labeled with Δp, are from higher to lower pressure in the direction of the arrow. Further, with the exception of the pumping section defined on the surface of the bearing cone, Δp and flow are in the same direction. Thus, the fluid flow over the surface 612 of the cone 608, is as marked by the arrow 609 and continues axially toward the distal end 626 of the shaft following the path marked by arrow 622 and returns to the apex 640 of the cone following the arrow 625.

In order to provide a means for fluid to be inserted into the fluid dynamic bearing, as well as to provide a means for air bubbles to be expelled from the bearing 610 while maintaining sealing stiffness adjacent the bearing, a centrifugal capillary seal 600 is incorporated into the design, leading from the open end 662 of the fixed shaft 500 down to the apex 640. The seal is formed between a wall 663 of the shield seal 668 which rotates with and is supported from (or even integrated with) bearing seat 506 and hub 516, and wall 661 of seal cone 628 which is supported from the shaft. The diverging walls 661, 663 are separated by a measurable gap 662 at the axially outer end of the seal; the narrowest point is at or near the apex 640 of the sealed design. As explained above, the centrifugal capillary seal 600 utilizes centrifugal force which is created by the relative rotation of the walls 661, 663 to create a pressure gradient represented by the arrow Δp, 670, to push oil back into the motor whenever the motor is spinning.

To prevent fluid leakage, the bearing seat or hub section 506 includes a groove 680 in an axial surface adjacent the shield seal 668. A gasket 682 is compressed between the seat 506 and seal 668 to prevent any fluid escape between the parts.

Establishing this combination of pressure gradients also provides a means for expelling air bubbles from the entire fluid dynamic bearing system. That is, some air bubbles may appear in the system and if allowed to remain, have a negative effect on performance. However, by establishing the pressure gradients represented by the various arrows Δp over the surfaces of the bearing cone, and along the reservoir of the capillary seal, the air bubbles can be expelled. Specifically, it is known that when the pressures are established, and the relative rotation has been established, the air bubbles will move from the point of highest pressure to lowest pressure. Therefore, any air bubbles appearing in or near the quiet zone 669 of the groove pumping seal 602 (explained in detail in the incorporated application) or near the narrow portion 642 of the bearing cone 608, or along any surface of the bearing cone 608 will move toward the point of lowest pressure which is the apex 640 of the bearing cone 608 and sealing cone 628. Once reaching that point, the air bubbles will continue to the point of lowest pressure, moving out through the reservoir of the centrifugal capillary seal and being expelled through the meniscus of the capillary seal. Thus, this system operates to continuously purge itself of any air which might inadvertently enter the system, while very effectively sealing the fluid within the bearing system.

Alternatives to the invention described above would certainly occur to a person of skill in the art who studies this invention disclosure. Thus, the centrifugal capillary seal of this invention is not limited to use with the conical or spherical bearings shown in the figures; it would be equally effective to seal the open end of a hydrodynamic bearing which incorporates a journal bearing, a thrust plate or a combination thereof, such as already well known in the prior art. Further, the design of this invention would be substantially more effective than the prior art in sealing both ends of a hydrodynamic bearing which is open at both ends, even without the use of the grooved pumping seal on the opposite side of the pressure generating surfaces of the hydrodynamic bearing. Calculation on an exemplary embodiment have shown that a centrifugal capillary seal pair has a stiffness of 2343 Pa/mm at 7200 RPM, or 4.4 times the stiffness of a measured conventional capillary seal. Thus, regardless of the hydrodynamic bearing incorporated in the overall design, this centrifugal capillary seal is substantially more effective than conventional capillary seals. Further, when used on both ends of a hydrodynamic bearing design open at both ends, the seal would be able to accommodate greater pressure imbalances within the motor. As noted above, this approach also enhances the volume of the centrifugal capillary seal; the provision of the enlarged reservoir accommodates greater changes in volume which may occur due to thermal expansion or evaporation.

Figure 7:
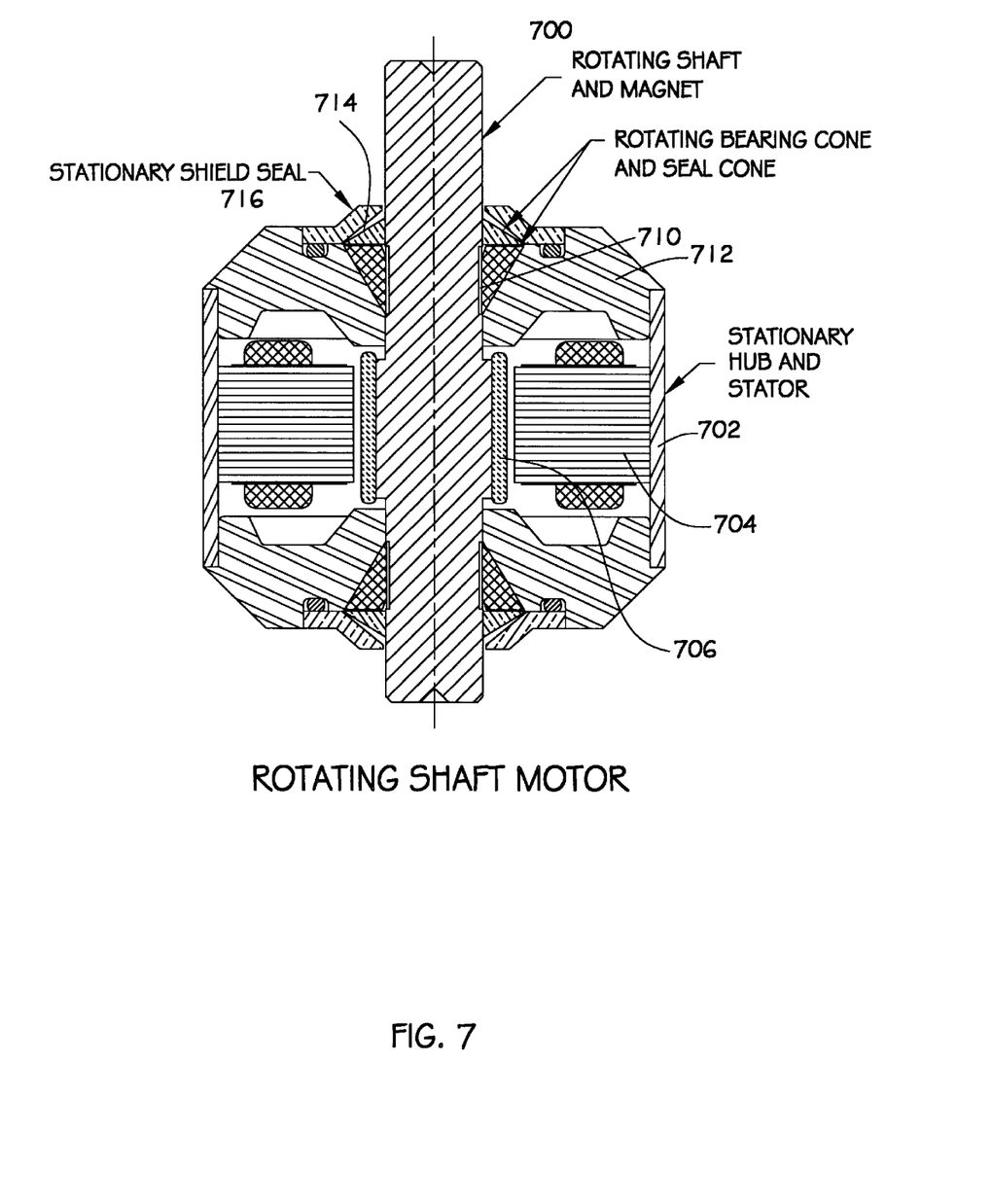
FIG. 7 illustrates an alternative embodiment utilizing a rotating shaft.

A further alternative is shown in FIG. 7, illustrating a combination of a rotating shaft 700 surrounded by a hub 702 supporting a stator 704. The stator 704 is aligned with a magnet 706 which rotates with shaft 700. The fluid bearing is now established between bearing cone 710 and bearing seat 712. The adjacent centrifugal capillary seal is defined by seal cone 714 which rotates with the shaft 700 and stationary shield seal 716. The principles of operation of the centrifugal capillary seal remain as described above.

Figure 8:
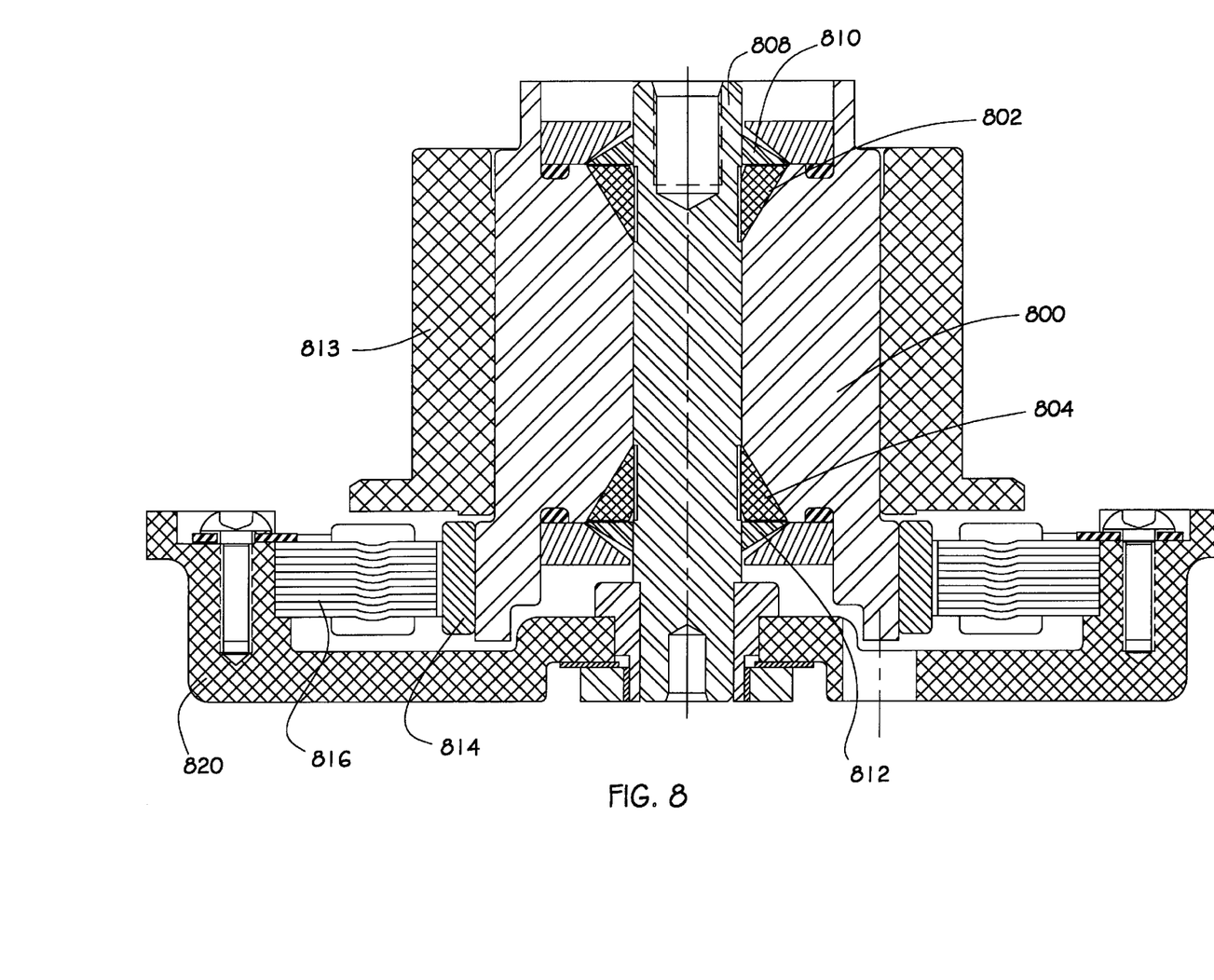
FIG. 8 is a vertical sectional view of a motor utilizing centrifugal capillary seals with the magnet and stator located below the hub rather than within the hub.

FIG. 8 illustrates the use of centrifugal capillary seals in a motor where a sleeve 800 surrounds the shaft and extends substantially from one fluid bearing 802 to the other fluid bearing 804. The facing surfaces of shaft 808 and sleeve 800 may or may not form a fluid dynamic bearing, depending on the needs of the motor. A centrifugal capillary seal 810, 812 is placed at each end of the shaft to establish a desired sealing stiffness adjacent each fluid dynamic bearing 802, 804.

To complete the design, a magnet 814 is supported from the sleeve 800; preferably, the magnet is axially aligned with the hub 813. A stator 816 is supported from a base 820 radially aligned with the magnet 814 and substantially axially aligned with hub 813. This approach provides a motor with a hub of small cross-section to minimize space utilization by the motor.

Other variations on the subject design may occur to a person of skill in the art who studies the disclosure. Therefore, the scope of the invention is to be defined only by the following claims.

What is claimed is:

1. A discrete cartridge utilizing a fluid dynamic bearing to support a sleeve for relative rotation about a shaft comprising:

first and second conical bearings whose narrow ends are closely adjacent along said sleeve, and whose wider ends are distal from one another, each of said conical bearings, including a cone, having a surface facing an interior surface of said sleeve to define a gap filled with fluid for said fluid dynamic bearing, a centrifugal capillary seal adjacent each of said first and second conical bearings comprising a reservoir defined by a pair of relatively diverging generally rotating walls, said reservoir being at least partially filled with said fluid, and a meniscus formed across said fluid between said walls to prevent said fluid from leaving said gap, a radial surface of the cone cooperating with a radial surface of the sleeve to establish the radial, diverging walls of said reservoir, at least one of the surfaces of the cone and the facing interior surface of the sleeve, which together define the fluid conical bearing, having grooves thereon for pumping fluid away from the reservoir, and said cone including an opening communicating with the reservoir from a distal end of the cone to allow said fluid to circulate behind the surface of each conical bearing and to support the formation of a meniscus of an end at said reservoir.

2. A discrete cartridge as claimed in claim 1 wherein said radial surface of said sleeve continues into a generally axially extending wall which diverges from an axial wall of said cone to form said meniscus of said capillary seal.

3. A discrete cartridge as claimed in claim 1 including a top seal plate affixed to an outer surface of said shaft and cooperating with a generally conical outer surface of said cone to define one of said walls of said reservoir, a meniscus being formed from an opposite wall of said reservoir to a facing surface of said seal plate.

4. A discrete cartridge as claimed in claim 3 further including said opening between said cone and said shaft and a passage through said cone communicate with a reservoir defined in an outer surface of said shaft to provide additional fluid to said fluid dynamic bearing.

5. A discrete cartridge as claimed in claim 1 wherein the cone includes a sealing cone affixed to an outer surface of said shaft and having a acute angled surface defining one of said radial surfaces of said reservoir, said reservoir being defined between said acute angled surfaces of said sealing cone and an acute angled surface a of hub, said acute angled walls tapering together toward an apex of said sealing cone.

6. A discrete cartridge as claimed in claim 5 wherein said sealing cone further includes a generally radial surface facing said radial surface of said bearing cone and defining a gap therewith in communication with said gap of said fluid dynamic bearing.

7. A discrete cartridge as claimed in claim 6 wherein relative rotation of said hub to said sealing cone creates dynamic pressure on bearing fluid in said reservoir to force said fluid toward a common apex of said sealing cone and said bearing cone whereby said fluid is maintained within said reservoir.

8. A discrete cartridge as claimed in claim 7 wherein one of complementary surfaces of said bearing cone and said sealing cone has grooves thereon to create pressure away from said apex of said bearing cone toward a narrow end of said bearing cone, air bubbles which appear in said fluid moving against said pressure to said apex of said bearing cone and through said reservoir to an open end of said reservoir.

9. A spindle motor for use in a disc drive comprising a shaft and a sleeve surrounding the shaft and mounted for relative rotation supported by a conical bearing, including a cone mounted on the shaft and having a surface facing a surface of the sleeve across a fluid-filled gap, and

- a centrifugal capillary seal for use in combination with a conical bearing, said centrifuigal capillary seal comprising a reservoir defined by a pair of relatively diverging generally radial walls, said reservoir being at least partially filled with said fluid, a meniscus formed across the fluid to protect said fluid from leaving said gap,
- a stationary passageway extending from a distal end of the conical bearing to the reservoir, and
- a centrifugal force generated by relative rotation of said shaft and said sleeve establishing a pressure gradient to force fluid back into said gap, said passageway supporting the maintenance of the meniscus in the reservoir and maintaining the fluid in the gap, wherein the conical bearing is structured to provide a recirculation of said fluid around said cone and to support the formation of said meniscus at an end of said reservoir.

10. A spindle motor as claimed in claim 9 wherein one of said walls is supported from said shaft and the other of said walls is supported from said sleeve to allow relative rotation of said shaft and said sleeve to thereby establish a pressure gradient against said fluid in said gap.

11. A spindle motor seal as claimed in claim 10 wherein said relative rotation of said shaft and said sleeve establishes a pressure gradient along said generally radial wall of said sleeve, said pressure being higher at a distal point in said gap from said meniscus, air bubbles being ejected from said reservoir, due to said pressure gradient.

12. A spindle motor seal as claimed in claim 11 wherein said relatively diverging generally radial walls establish a larger reservoir capacity than in a capillary seal comprising generally axial walls.

13. In a spindle motor for a disc drive including a hub supporting one or more discs for rotation about a central axis of a shaft of said motor, wherein

- said shaft has a conical hydrodynamic bearing defined in a conical bearing gap between a cone supported on said shaft and a rotating, surrounding sleeve, said gap having a bearing fluid therein,
- centrifugal means for defining a reservoir adjacent said bearing gap and for maintaining fluid in said gap,
- and recirculation means for coupling said conical bearing gap to said reservoir to maintain the fluid in the gap and the reservoir.

14. A motor as claimed in claim 13 including means for establishing a pressure gradient along said reservoir for maintaining fluid in said gap.

* * * * *